T. J. CORNELL.
Gang-Plow.
No. 54,693. Patented May 15, 1866.
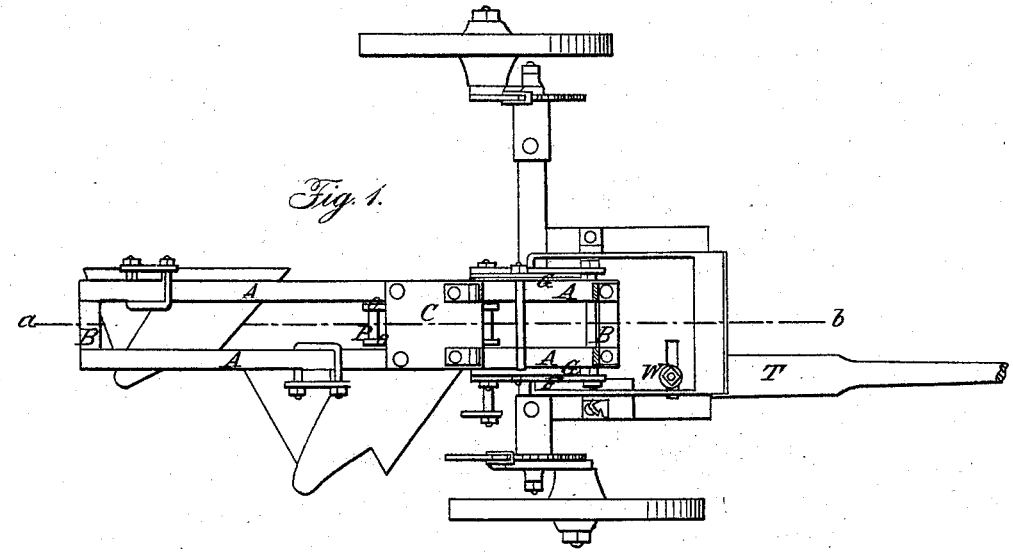
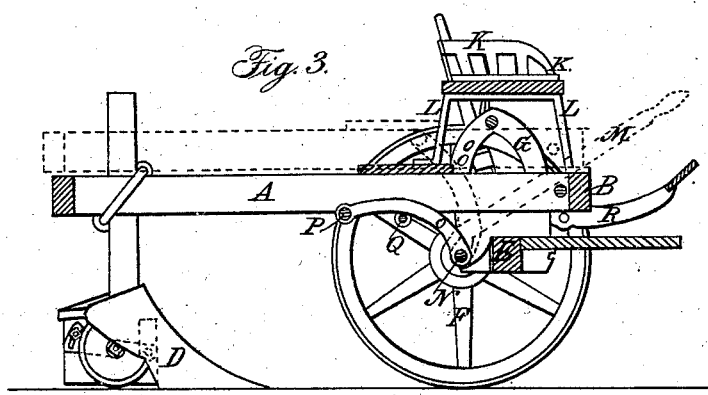
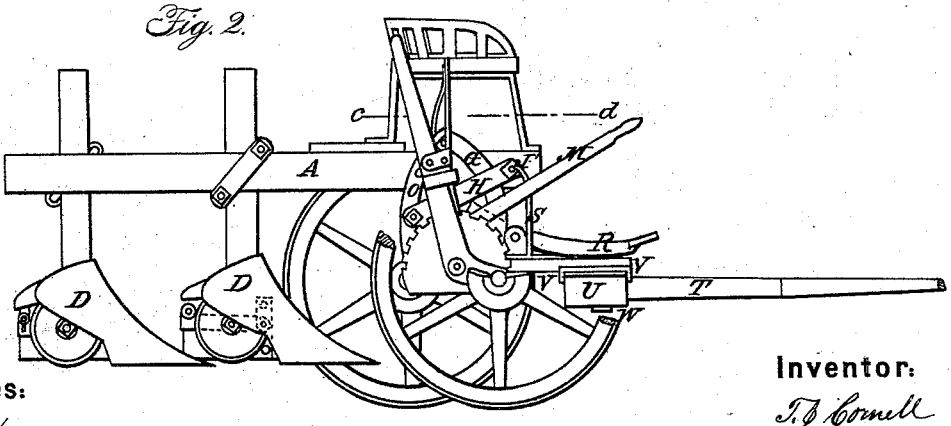
Witnesses:
Inventor:

UNITED STATES PATENT OFFICE.

THOS. J. CORNELL, OF DECATUR, ILLINOIS.

IMPROVEMENT IN GANG-PLOWS.

Specification forming part of Letters Patent No. 54,693, dated May 15, 1866.

*To all whom it may concern:*

Be it known that I, THOMAS J. CORNELL, of Decatur, in the county of Macon and State of Illinois, have made new and useful Improvements in Gang-Plows; and I do hereby declare the following to be a full, clear, and exact description of the nature, construction, and operation of the same, reference being had to the accompanying drawings, which are made part of this specification, and in which—

Figure 1 is a top or plan view, the portion above section-line C D, Fig. 3, being removed. Fig. 2 is a side elevation. Fig. 3 is a section in the line $a\,b$, Fig. 1.

The same letters refer to corresponding parts in the different figures.

The invention consists in devices for raising the fore end and the hind end of the beam to regulate the action and position of the plows; in the mode of attaching the front end of the beams to the carriage; in the mode of holding the plows down to their work in hard ground; the mode of attaching the tongue to secure parallelism of the latter with the line of the draft.

The beams A A of the plow are secured together so as to act and move as one piece, the blocks and plate B B C forming the means of connection. The plows D D are attached by standards to the beams in any suitable manner.

The carriage E and wheels F F support the arch-pieces G G, to which the beams A are attached by the links H and bolts J' J, the latter entering the holes I, which admit of the vertical adjustment of the rear end of the link.

K is a seat supported by legs L L on the forward part of the beams.

M is a lever vibrating in a vertical plane on an axis, N, to which are attached curved arms O O, united at the end by a rod, and upon the forward motion of the lever M the end of the curved arms, coming in contact with the under side of the plate C, raises the forward end of the beams A, which causes them, as the team moves ahead, to come out of the ground.

When the plows are in the ordinary working position (shown in Fig. 3) any vertical vibration of the rear end of the beams causes them to move upon the bolt J' as an axis of vibration; but when the forward ends of the beams are lifted from the ground, as described in the preceding paragraph, the point upon which they vibrate is transferred to the end J of the links H, and the driver, who had risen to his feet while the forward ends were raised, now sits down, vibrating the beams on the axis J, the plate C slipping on the ends of the curved arms O as the hind ends of the beams rise to assume the position shown in Fig. 2 and dotted lines in Fig. 3.

Another mode of lifting the forward end of the beams, which may be used as auxiliary to the means detailed—namely, the lever M and bent arm O—is the double foot-lever R, which rocks in standards on the carriage, its rear ends coming under the links H to raise the ends J', as the other ends are pivoted in the arches G.

To reset the plows again in the soil, let the lever M be drawn back from engagement with the catch S, when the plows descend point first and assume their nomal position, Fig. 3, the beams being held forcibly down, if necessary, by the backward vibration of the lever M, which causes the under edges of the bent arms O to rest upon the rod Q, which is secured to the beams.

The tongue is attached to the carriage by means of being slipped into a socket, which has a lateral adjustment in guides underneath the foot-board of the carriage. T is the tongue, U the socket, and V the guides, of the box attached to the foot-board. It is designed that in whatever position the tongue may be placed it shall have any side draft. The adjustment of the plows or the disuse of one of them will require a lateral adjustment of the tongue, which is accomplished by the means described without throwing it out of parallelism with the line of draft. The required adjustment being attained, it is fixed by means of the bolt W.

Having described my invention, what I claim therein as new, and desire to secure by Letters Patent, is—

1. The combination of the lever M and bent arm O, for raising the beams from beneath at a point in the rear of their forward point of attachment, so as to be vibrated upon the said lifting device by a weight applied to the forward end, substantially as described.

2. The combination of the link H, attached to the forward end of the beams and to the carriage, and operating substantially as described.

3. The combination of the beam and the curved arm, or its equivalent, which in its backward motion operates to keep the beam down under the circumstances described.

4. The mode of attaching the tongue to the carriage, consisting of the laterally-sliding socket and the guides, arranged and operating as described.

5. The combination of the links H and standards G, whose holes admit of the vertical adjustment of the links therein.

6. The arrangement of the foot-lever R, the links H, and beams A, operating as described.

To the above specification of my improvement in gang-plows I have signed my hand this 8th day of February, A. D. 1866.

THOS. J. CORNELL.

Witnesses:
C. D. SMITH,
C. A. PETTIT.